(12) United States Patent
Ito

(10) Patent No.: US 11,523,008 B2
(45) Date of Patent: Dec. 6, 2022

(54) INFORMATION PROCESSING APPARATUS THAT SEARCHES FOR AN EXTERNAL APPARATUS COMMUNICABLE FROM THE INFORMATION PROCESSING APPARATUS, AND STORAGE MEDIUM, AND CONTROL METHOD THEREOF

(71) Applicant: CANON KABUSHIKI KAISHA, Tokyo (JP)

(72) Inventor: Yuki Ito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/983,626

(22) Filed: Aug. 3, 2020

(65) Prior Publication Data
US 2021/0044706 A1    Feb. 11, 2021

(30) Foreign Application Priority Data

Aug. 9, 2019 (JP) .............................. JP2019-147446

(51) Int. Cl.
*H04N 1/00* (2006.01)
*H04W 4/80* (2018.01)

(52) U.S. Cl.
CPC ..... *H04N 1/00315* (2013.01); *H04N 1/00214* (2013.01); *H04W 4/80* (2018.02)

(58) Field of Classification Search
CPC ....................... H04N 1/00315; H04N 1/00214
USPC ................................ 358/1.1–1.18, 474, 402
See application file for complete search history.

(56) References Cited

U.S. PATENT DOCUMENTS

| | | | | |
|---|---|---|---|---|
| 10,856,253 | B1* | 12/2020 | Files | H04W 16/28 |
| 2015/0147067 | A1* | 5/2015 | Ryan | H04W 4/02 |
| | | | | 398/118 |
| 2016/0112839 | A1* | 4/2016 | Choi | H04W 4/80 |
| | | | | 455/41.2 |
| 2017/0134606 | A1* | 5/2017 | Kim | H04W 4/023 |
| 2018/0176776 | A1* | 6/2018 | Knaappila | H04W 12/06 |
| 2019/0104384 | A1* | 4/2019 | Abou-Rizk | G01S 5/08 |
| 2019/0303051 | A1* | 10/2019 | Hwang | G06F 3/126 |
| 2020/0103486 | A1* | 4/2020 | Knaappila | G01S 5/04 |
| 2020/0103513 | A1* | 4/2020 | Knaappila | G01S 11/06 |

FOREIGN PATENT DOCUMENTS

JP    6204073 B2    9/2017

* cited by examiner

*Primary Examiner* — Gabriel I Garcia
(74) *Attorney, Agent, or Firm* — Canon U.S.A., Inc. IP Division

(57) ABSTRACT

According to an aspect of the present disclosure, a terminal performing Bluetooth® communication with an image processing apparatus, includes a memory and a processor in communication with the memory. The processor performs receiving a Bluetooth® packet transmitted from the image processing apparatus, displaying, on the display unit, information on the image processing apparatus as a retrieval result, based on the received packet, detecting a location direction of the image processing apparatus based on a phase of a radio wave of the received packet, and displaying, on the display unit, the detected location direction of the image processing apparatus.

15 Claims, 11 Drawing Sheets

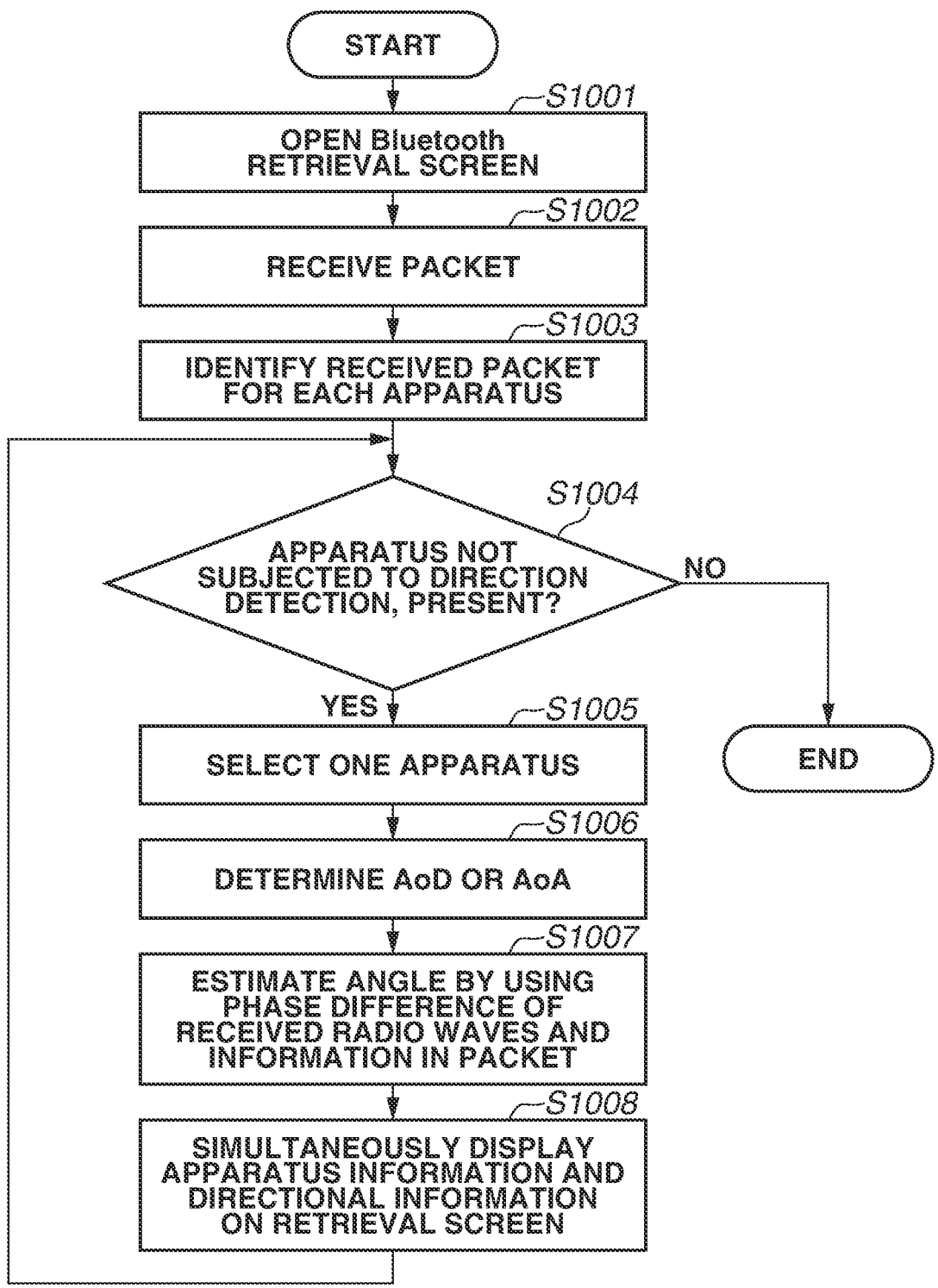

INFORMATION PROCESSING APPARATUS THAT SEARCHES FOR AN EXTERNAL APPARATUS COMMUNICABLE FROM THE INFORMATION PROCESSING APPARATUS, AND STORAGE MEDIUM, AND CONTROL METHOD THEREOF

BACKGROUND

Field

The present disclosure relates to a technology to search an external apparatus communicable from an information processing apparatus.

Description of the Related Art

In recent years, in a field of image processing apparatuses such as a multifunctional peripheral and a printer, the number of apparatuses with a Bluetooth® function is increasing. A mobile terminal can search an image processing apparatus through Bluetooth® communication, and can transmit print data and receive scan data. to/from the image processing apparatus through wireless local area network (LAN) communication.

When a user uses the mobile terminal to search the image processing apparatus with which the user desires to communicate through the wireless LAN communication, the mobile terminal receives a Bluetooth® advertise packet transmitted from the image processing apparatus, and displays information regarding the image processing apparatus on a search screen of the mobile terminal based on information in the received packet. Further Japanese Patent No. 6204073 discusses a technology to estimate a location direction of a wireless apparatus based on change in intensity of a radio signal received from the wireless apparatus when the direction of a wireless retrieval apparatus is changed.

By the technology disclosed in Japanese Patent No. 6204073, however, it can be necessary to change the direction of the wireless retrieval apparatus in order to detect the direction of the wireless apparatus, which can cause inconvenience to a user.

SUMMARY

According to an aspect of the present disclosure, a terminal performing Bluetooth® communication with an image processing apparatus includes a memory, and a processor in communication with the memory. The processor performs receiving a Bluetooth® packet transmitted from the image processing apparatus, displaying, on a display unit, information on the image processing apparatus as a retrieval result, based on the received packet, detecting a location direction of the image processing apparatus based on a phase of a radio wave of the received packet, and displaying, on a display unit, the detected location direction of the image processing apparatus.

Further features of the present disclosure will become apparent from the following description of exemplary embodiments with reference to the attached drawings.

BRIEF DESCRIPTION OF THE DRAWINGS

FIG. 10 is a flowchart of processing by the mobile terminal to display the direction of the image processing apparatuses according to the second exemplary embodiment.

DESCRIPTION OF THE EMBODIMENTS

Some exemplary embodiments of the present disclosure are described with reference to drawings. The following exemplary embodiments do not limit the disclosure according to claims, and all of combinations of features described in the exemplary embodiments are not necessarily essential for the solving means of the disclosure.

First Exemplary Embodiment

Figure 1:
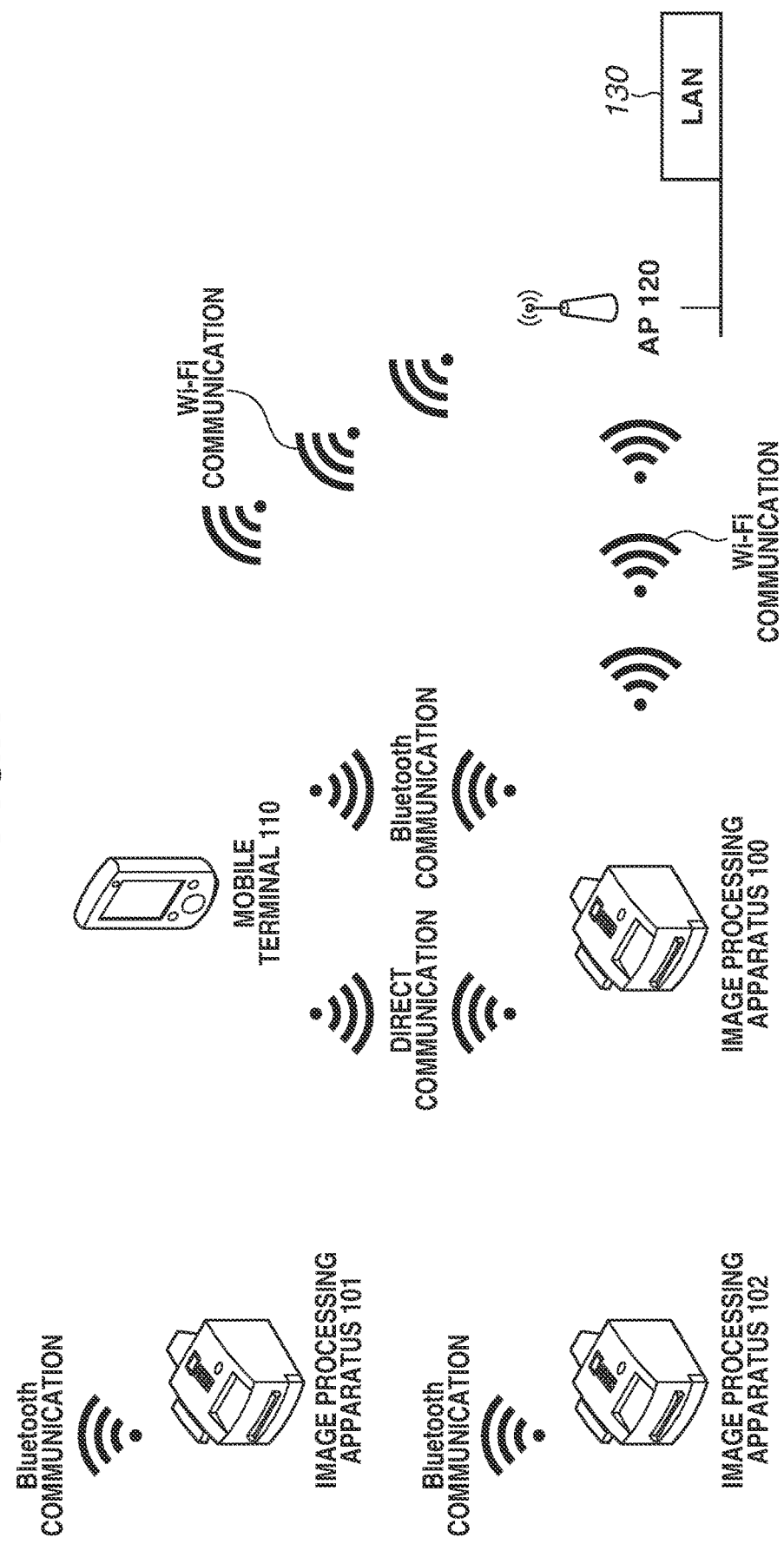
FIG. 1 is a network configuration diagram according to one embodiment.

FIG. 1 is a network configuration diagram. A mobile terminal 110 is wirelessly connected to a local area network (LAN) through an access point 120. An image processing apparatus 100 is connected to the LAN through a cable or is wirelessly connected to the LAN through the access point 120, and can communicate with the mobile terminal 110. The image processing apparatus 100 internally includes an access point, and can perform wireless direct communication with the mobile terminal 110. The image processing apparatus 100 can perform Bluetooth® communication with the mobile terminal 110. Image processing apparatuses 101 and 102 each having a configuration similar to the configuration of the image processing apparatus 100 are present. Further, a plurality of image processing apparatuses that can perform the Bluetooth® communication is present in addition to the image processing apparatuses 101 and 102.

Figure 2:
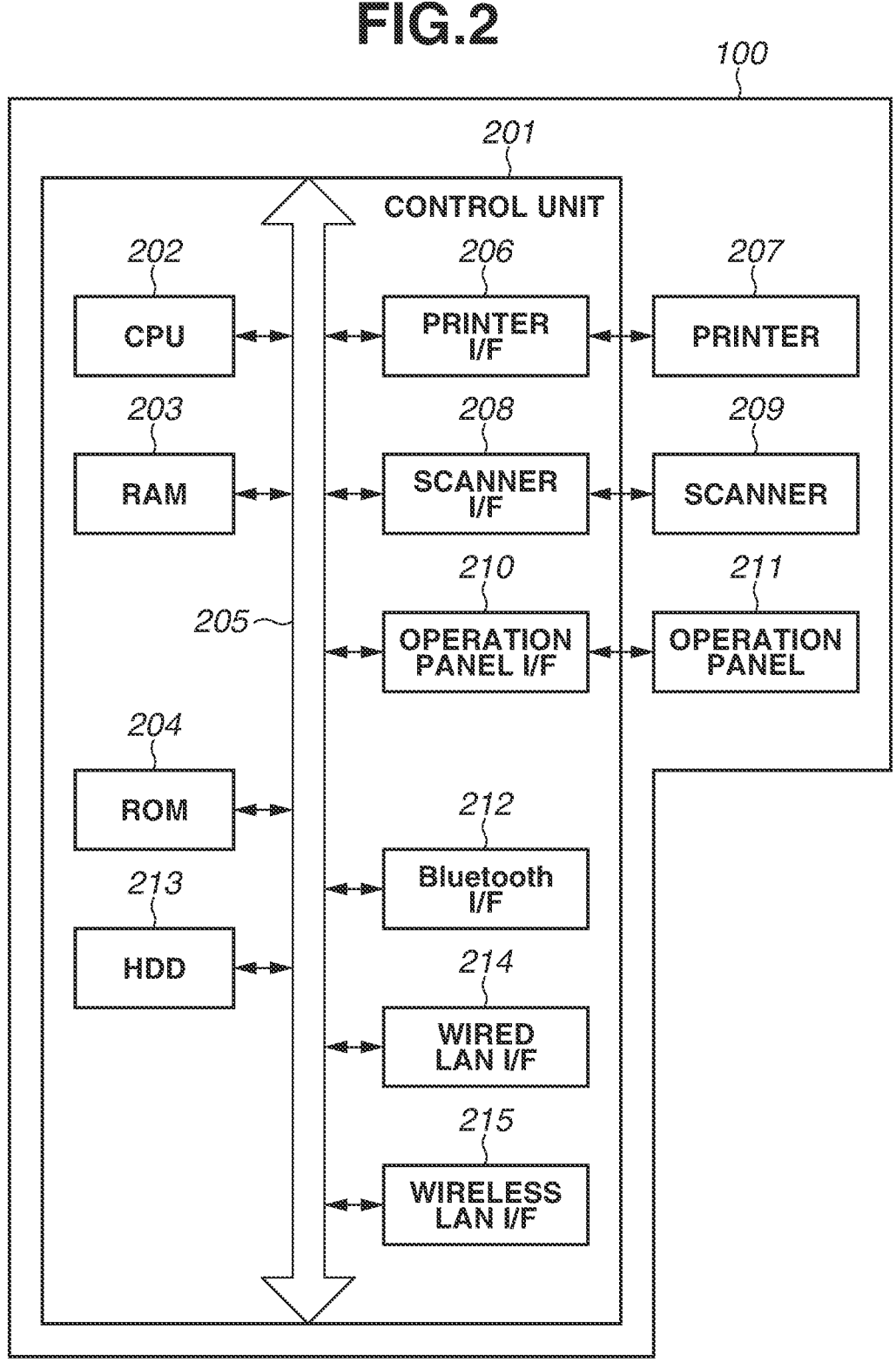
FIG. 2 is a block diagram illustrating a hardware configuration of an image processing apparatus according to one embodiment.

FIG. 2 is a block diagram illustrating a hardware configuration of the image processing apparatus 100. A control unit 201 including a central processing unit (CPU) 202 controls the entire operation of the image processing apparatus 100. The CPU 202 reads out control programs stored in a read only memory (ROM) 204, and performs various kinds of control such as communication control. A random access memory (RAM) 203 is used as a main memory of the CPU 201 and a temporary storage area such as a work area. A hard disk drive (HDD) 213 stores data, various kinds of programs, and various kinds of setting information.

A printer interface (I/F) 206 outputs an image signal to a printer (printer engine) 207. A scanner I/F 208 receives a read image signal from a scanner (scanner engine) 209. The CPU 202 processes the image signal received through the scanner I/F 208, and outputs the processed image signal as a recording image signal to the printer I/F 206.

An operation panel I/F 210 connects an operation panel 211 and the control unit 201. The operation panel 211 is provided with a liquid crystal display unit having a touch panel function, a keyboard, and the like.

A wired LAN I/F 214 transmits information to external apparatuses or receives various kinds of information from the external apparatuses through a cable. A wireless LAN I/F 215 wirelessly transmits information to the external apparatuses or wirelessly receives various kinds of information from the external apparatuses.

A Bluetooth® I/F 212 transmits information to the external apparatuses or receives various kinds of information from the external apparatuses through the Bluetooth® communication. The image processing apparatus 100 supports the Bluetooth® 5.1 standard.

The units inside the control unit 201 are connected through a system bus 205.

Figure 3:
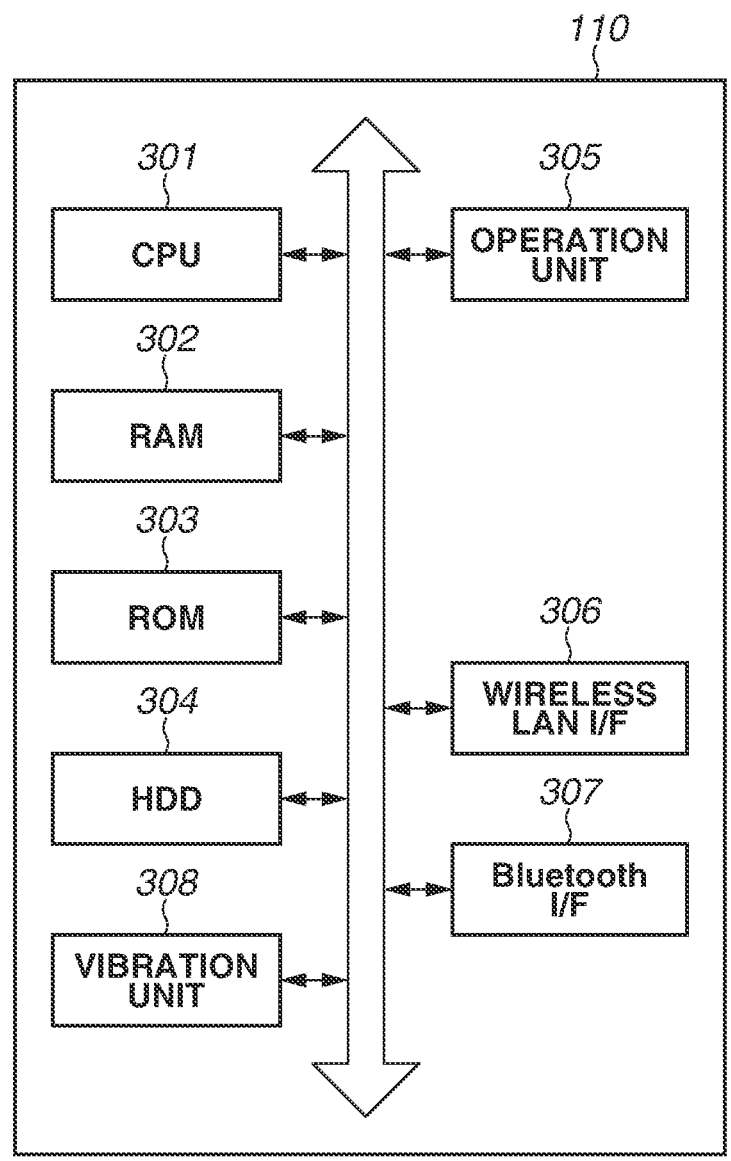
FIG. 3 is a block diagram illustrating a hardware configuration of a mobile terminal according to one embodiment.

FIG. 3 is a block diagram illustrating a hardware configuration of the mobile terminal 110.

A CPU 301 reads out control programs stored in a ROM 303, and performs various kinds of control such as communication control. A RAM 302 is used as a main memory of the CPU 301 and a temporary storage area such as a work area. An HDD 304 stores data, various kinds of programs, and various kinds of setting information.

In a case of the mobile terminal 110, one CPU 301 performs each process illustrated in flowcharts described below; however, the processing may be performed in another way. For example, a plurality of CPUs may cooperate with one another to perform each process described in the flowcharts described below.

An operation unit 305 is provided with a liquid crystal display unit having a touch panel function and a software keyboard, and displays various kinds of screens described below A user can input instructions and information to the mobile terminal 110 through the operation unit 305. A wireless LAN I/F 306 performs wireless communication with external apparatuses such as the access point 120. A Bluetooth® I/F 307 performs wireless communication by Bluetooth® with the external apparatuses such as the image processing apparatus 100. The mobile terminal 110 supports the Bluetooth® 5.1 standard or newer standards.

A vibration unit 308 vibrates the mobile terminal 110.

FIGS. 4A to 4D are diagrams illustrating a mechanism of direction detection. To realize the direction detection, it is necessary to provide a plurality of antennas on at least any of a transmission side and a reception side of a Bluetooth® packet. There are a. case where the plurality of antennas is provided on the reception side and an arrival angle of radio waves, namely, an angle of arrival (AoA) is estimated, and a case where the plurality of antennas is provided on the transmission side and a departure angle of radio waves, namely, an angle of departure (AoD) is estimated.

Figure 4A:
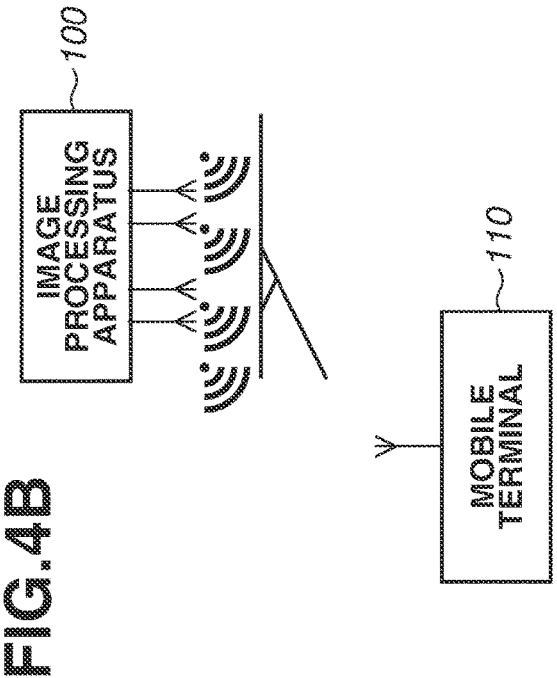
FIGS. 4A, 4B, 4C and 4D are diagrams illustrating a mechanism of direction detection according to one embodiment.

FIG. 4A is a schematic view illustrating a mechanism to determine the AoA.

To determine the AoA, it is necessary for the reception side to include the plurality of antennas. In the present exemplary embodiment, the mobile terminal 110 includes the plurality of antennas. The mobile terminal 110 can estimate the arrival angle of the Bluetooth® packet.

Figure 4B:
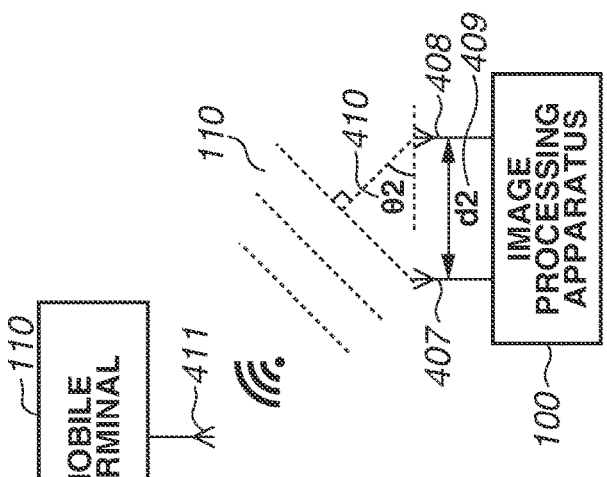

FIG. 4B is a schematic view illustrating a mechanism to determine the AoD.

To determine the AoD, it is necessary for the transmission side to include the plurality of antennas. In the present exemplary embodiment, the image processing apparatus 100 includes the plurality of antennas. The mobile terminal 110 can estimate the departure angle of the Bluetooth® packet transmitted from the image processing apparatus 100.

Figure 4C:
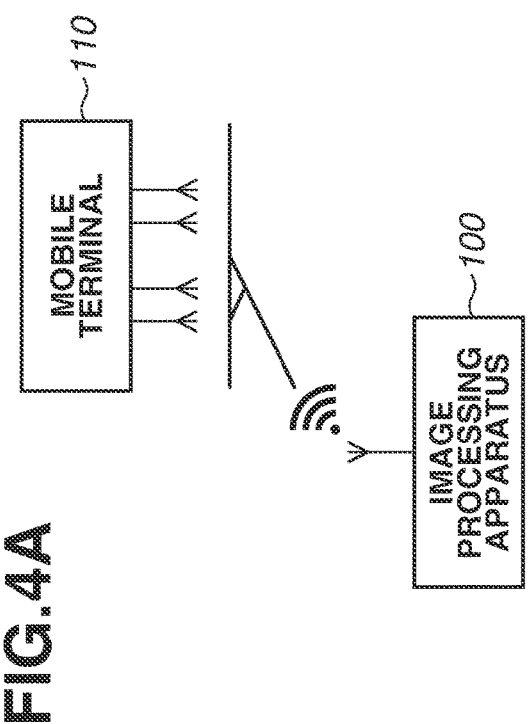

FIG. 4C is a detailed diagram illustrating the mechanism to determine the AoA. The packet transmitted from a Bluetooth® packet transmission antenna 406 of the image processing apparatus 100 is received by packet reception antennas 401 and 402 of the mobile terminal 110 with a time difference. A phase difference ψ between the radio wave received by the reception antenna 401 and the radio wave received by the reception antenna 402 is represented by an expression (1), $$\psi 1 = 2\pi \times (d1 \times \cos(\theta 1)/\lambda), \quad (1)$$

where θ1 is an arrival angle (AoA) 403 of the radio wave at this time, d1 is a distance between the reception antennas 401 and 402, and λ is a wavelength of the radio wave. In other words, a following expression (2) is established, and the AoA (θ1) can be determined.

$$\theta 1 = \arccos((\psi 1 \times \lambda)(2\pi \times d1)). \quad (2)$$

As a result, the mobile terminal 110 can detect a direction of the image processing apparatus 100.

Figure 4D:
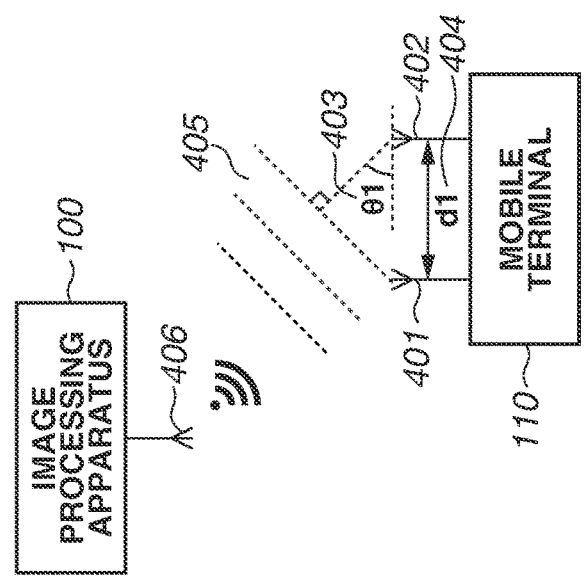

FIG. 4D is a detailed diagram illustrating the mechanism to determine the AoD. Packet transmission antennas 407 and 408 of the image processing apparatus 100 transmit the packet by shifting transmission timing of the packet. Information representing the shift of the transmission timing is transmitted from the image processing apparatus 100 to the mobile terminal 110, and the mobile terminal 110 can recognize the transmission timing of the packet from the packet transmission antennas 407 and 408. Further, the mobile terminal 110 can recognize a distance (d2) 409 between the packet transmission antennas 407 and 408 from information included in the packet. The radio waves transmitted from the packet transmission antennas 407 and 408 are received by a reception antenna 411 of the mobile terminal 110, and a departure angle θ2 (AoD) 410 of each of the radio waves can be determined from a phase difference between the radio waves. A phase difference ψ2 between the radio waves received by the reception antenna 411 is represented by an expression (3), $$\psi 2 = 2\pi \times d2 \times \cos(\theta 2)/\lambda, \quad (3)$$

where λ is a wavelength of the radio wave. In addition, the AoD (θ2) can be determined from an expression (4), $$\theta 2 = \arccos((\psi 2 \times 2\lambda)/(2\pi \times d2)). \quad (4)$$

Figure 5:
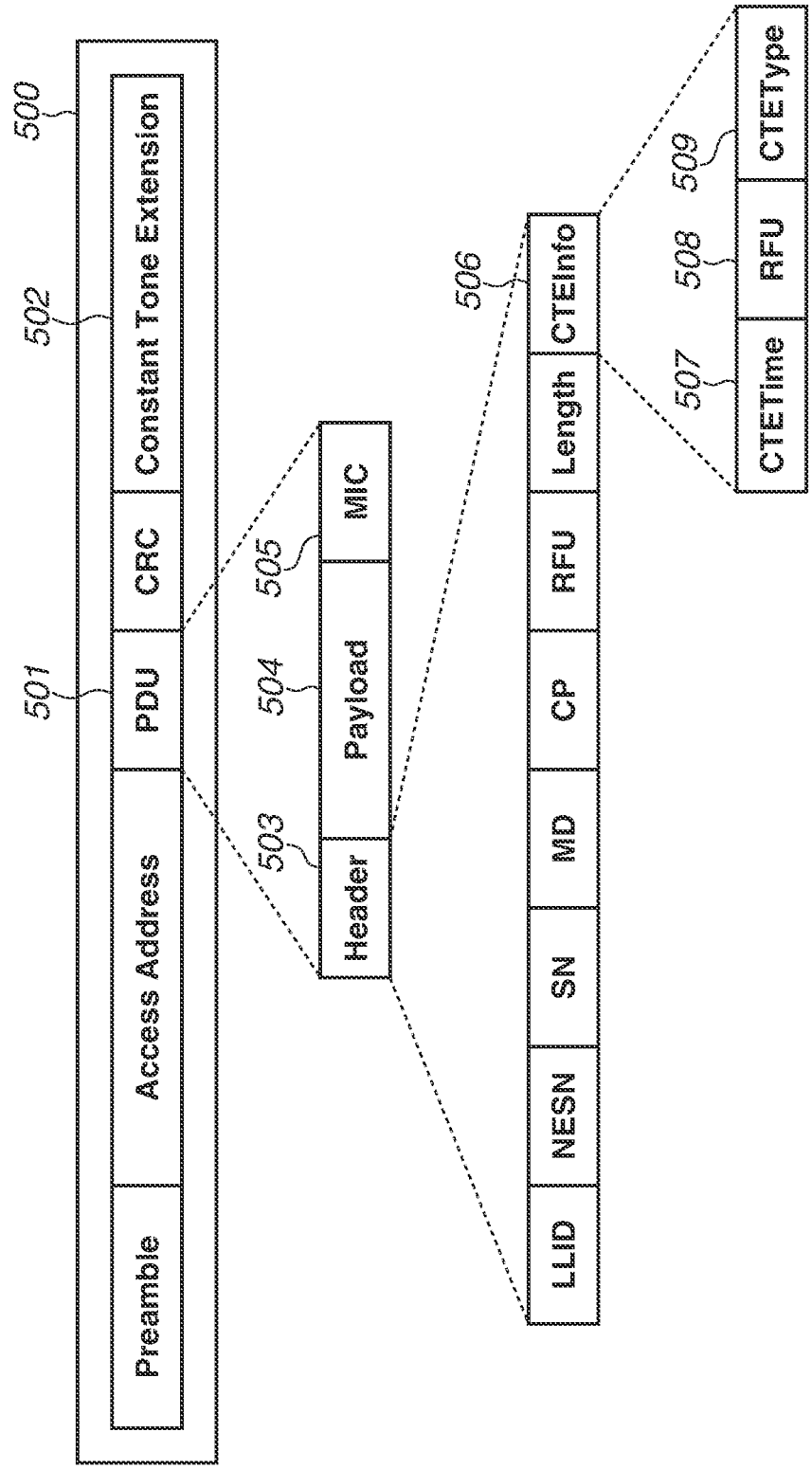
FIG. 5 is a diagram illustrating a. Bluetooth® 5.1 packet according to one embodiment.

As a result, the mobile terminal 110 can determine the departure angle of the radio wave transmitted from the image processing apparatus 100, and the mobile terminal 110 can estimate the direction of the image processing apparatus 100 based on the departure angle of the radio wave. The direction may be estimated based on a radio field intensity of the packet received by the mobile terminal 110, A reference of the angle calculation method is described below. https://www.silabs.com/whitepapers/bluetooth-angle-estimation-for-real-time-locationing FIG. 5 is a diagram illustrating the Bluetooth® 5.1 packet. The packet used for direction detection is transmitted at a fixed frequency and a fixed wavelength.

A Bluetooth® 5.1 packet 500 includes Protocol Data Unit (PDU) 501 and Constant Tone Extension (CTE) 502. The packet may include information necessary for direction detection, for example, a distance between antennas, packet transmission timing of a packet transmission antenna, and identifiers of an AoA and an AoD. The PDU 501 includes Header 503, Payload 504, and Message Integrity Check (MIC) 505. The Payload 504 includes information for the mobile terminal 110 to detect the radio field intensity, and flag information representing that the image processing apparatus 100 is unusable due to a reason such as execution of printing or occurrence of error. The Header 503 includes CTEInfo 506. The CTEInfo 506 includes CTETime 507, Reserved for Future Use (RFU) 508, and CTEType 509.

Figure 6:
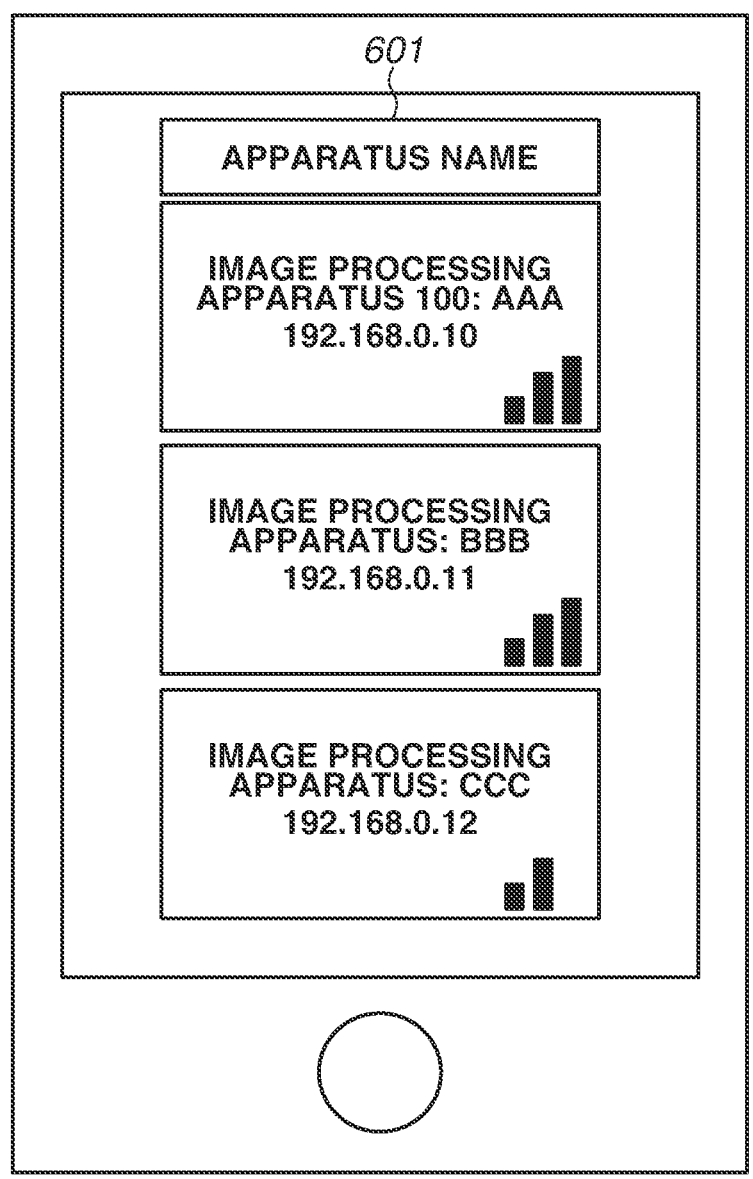
FIG. 6 is a diagram illustrating an apparatus retrieval result by the mobile terminal according to one embodiment.
Figure 7A:
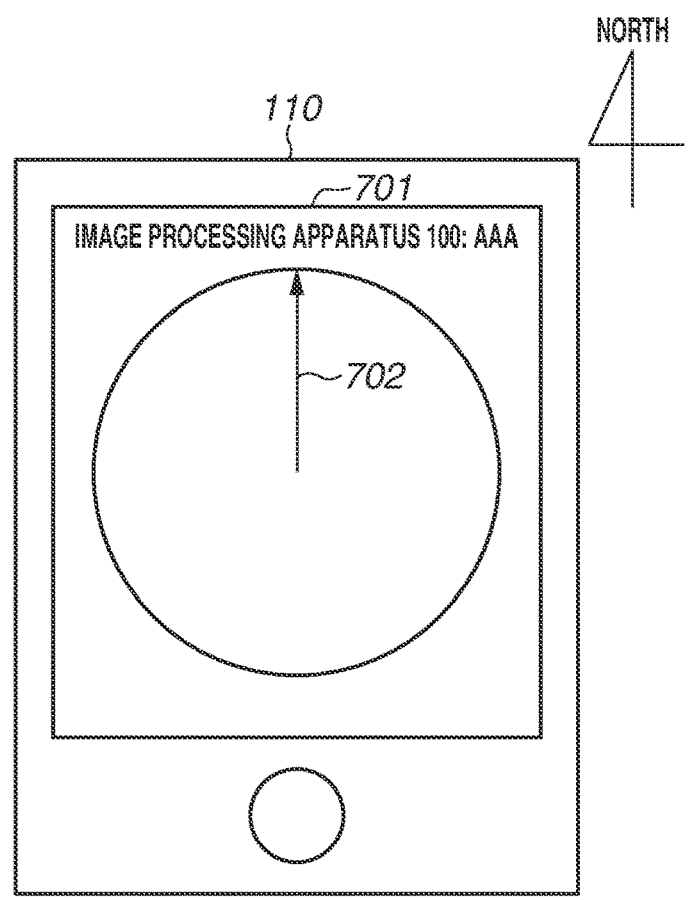
FIGS. 7A and 7B are diagrams each illustrating a state where the mobile terminal displays a direction of the image processing apparatus according to one embodiment.
Figure 7B:
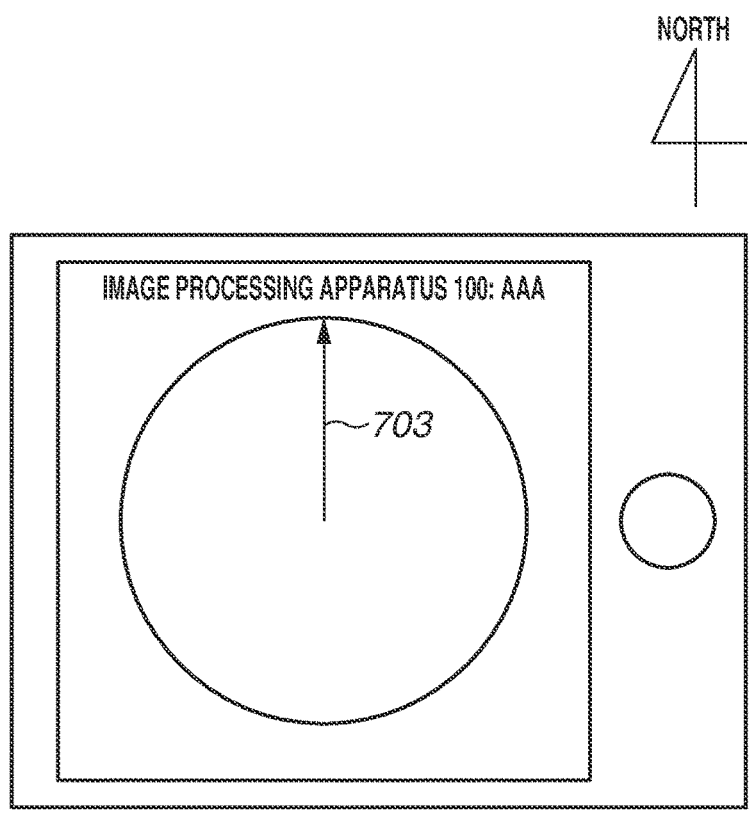

FIG. 6 is a diagram illustrating a retrieval result of the image processing apparatuses supporting Bluetooth® by the mobile terminal 110. When the user opens a screen to retrieve apparatuses supporting Bluetooth® on the mobile terminal 110, the mobile terminal 110 receives Bluetooth® advertise packets from the image processing apparatus 100 and nearby Bluetooth® apparatuses, and displays an apparatus name 601 included in each of the packets, on the retrieval screen. In this example, three apparatus names AAA, BBB, and CCC are retrieved, and an internet protocol (IP) address of each of the apparatuses and a radio field intensity of the packet received from each of the apparatuses are displayed. In this example, the terminal name and the IP address are displayed as the retrieval result; however, the displayed information is not limited as long as the information enables identification of the apparatus. When a name of an apparatus, the direction of which is to be displayed, is selected, a screen illustrated in FIG. 7A or 7B is displayed. In this example, the direction is displayed when the apparatus name is selected; however, the display is not limited thereto. A "direction display" button may be provided below each apparatus name, and the direction of the apparatus may be displayed when the corresponding button is pressed. Further, if an apparatus not supporting Bluetooth® 5.1 is selected to display the direction, the direction of the apparatus cannot be displayed. Therefore, an error message may be displayed. Furthermore, an apparatus supporting Bluetooth® 5.1 and an apparatus not supporting Bluetooth® 5.1 may be displayed in different ways so as to enable the user to recognize the apparatuses. The name of the apparatus not supporting Bluetooth® 5.1 may be displayed with a different color, grayed out, or provided with a check box. In a case where Payload 504 of the received packet includes the flag information representing that the image processing apparatus is unusable due to a reason such as execution of printing or occurrence of error, the display of the image processing apparatus may be changed. An apparatus that is out of the retrieval range due to movement of the mobile terminal 110 may be deleted from the retrieval screen.

FIGS. 7A and 7B are diagrams each illustrating the screen on which a location direction of the image processing apparatus 100 is displayed. The direction of the image processing apparatus 100 selected by the user in the retrieval screen of FIG. 6 is displayed. FIG. 7A is a diagram in a case where the user holds the mobile terminal 110 so as to direct an upper end of the mobile terminal 110 to the north. At this time, it is assumed that the target image processing apparatus is located on a north side of the mobile terminal 110. The mobile terminal 110 receives the Bluetooth® packet from the target image processing apparatus, and calculates the direction of the apparatus. As a result of the calculation, the mobile terminal 110 displays the direction of the apparatus by an arrow 702 on a liquid crystal display unit 701, with the mobile terminal 110 as a reference. In this example, the direction is detected from the Bluetooth® advertise packet of connectionless communication; however, the direction can be detectable from a packet of connection communication such as generic attribute profile (GATT) communication.

FIG. 7B is a diagram illustrating the screen displayed when the user reholds the mobile terminal 110 so as to direct the upper end of the mobile terminal 110 to the west from the state in FIG. 7A.

Since the target image processing apparatus is located in the north direction, the arrow 703 displayed in the mobile terminal 110 continuously points to the north.

Figure 8A:
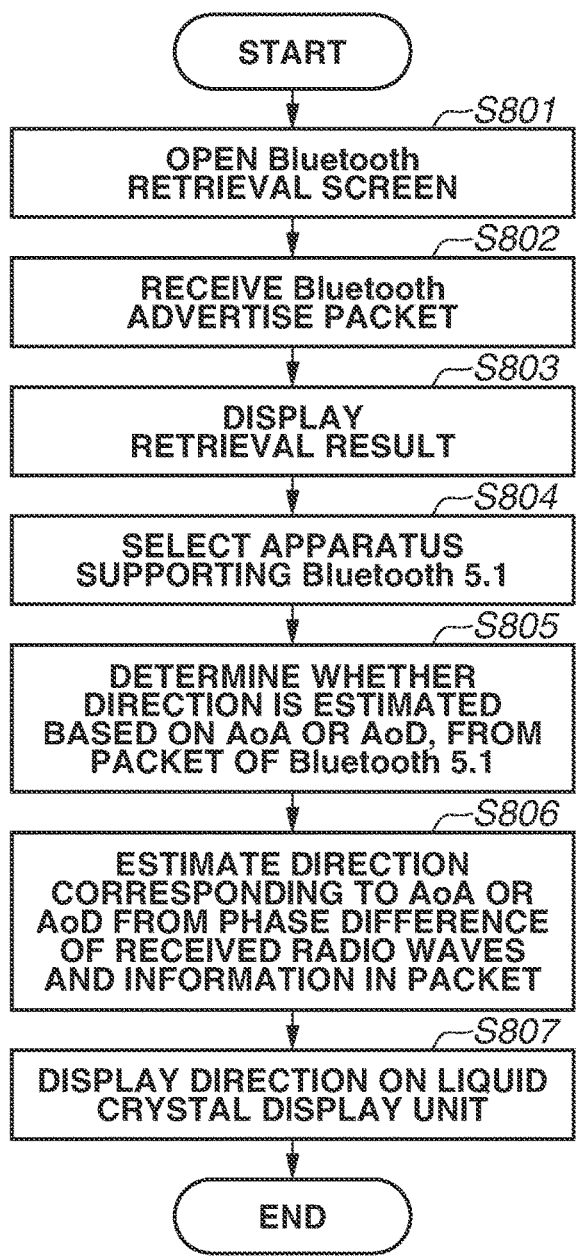
FIGS. 8A and 8B are flowcharts of processing by the mobile terminal to display the direction of the image processing apparatus according to one embodiment.

FIG. 8A is a flowchart of processing by the mobile terminal 110 to display the direction of the image processing apparatus 100. The processing by the mobile terminal 110 in the flowchart is realized when the CPU 301 of the mobile terminal 110 reads out the programs stored in the ROM 303, the HDD 304, or the like, and executes the programs.

In step S801, the mobile terminal 110 opens the screen to retrieve the image processing apparatuses supporting Bluetooth® in response to an instruction from the user. In step S802, the mobile terminal 110 receives the Bluetooth® advertise packets from the image processing apparatus 100 and nearby Bluetooth® apparatuses. In step S803, the mobile terminal 110 displays the retrieval result as illustrated in FIG. 6. At this time, a display method may be changed depending on the information on the received packet. In step S804, the mobile terminal 110 detects that the image processing apparatus 100 supporting Bluetooth® 5.1 has been selected. In step S805, the mobile terminal 110 determines whether the direction of the image processing apparatus 100 is estimated based on the AoA or AoD. in this example, the information on the packet transmitted from the image processing apparatus 100 is used to determine the AoA or AoD; however, the determination may be performed by another method. In step S806, the mobile terminal 110 calculates an angle by using a phase difference between the received radio waves, wavelengths of the received radio waves, and information included in the packet such as a distance between the antennas. The mobile terminal 110 estimates the direction of the image processing apparatus 100 by using the calculated result. In step S807, the mobile terminal 110 displays, on the liquid crystal display unit 701, the arrow 702 that indicates the direction of the image processing apparatus 100 based on the information on the direction estimated in step S806.

The effect by the processing in the flowchart of FIG. 8A is as follows. In the retrieval of the image processing apparatuses, the user can easily recognize the direction of the image processing apparatus.

Figure 8B:
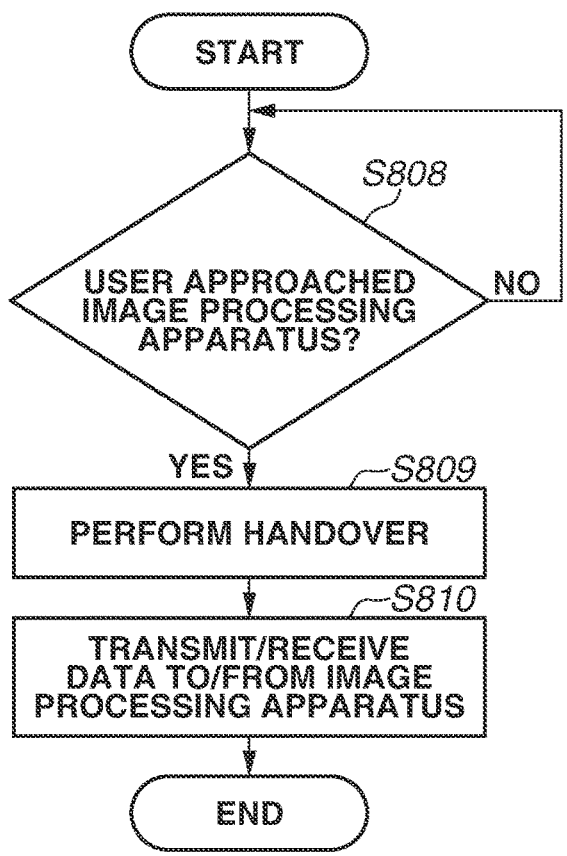

In a case where the user brings the mobile terminal 110 close to the image processing apparatus 100 while the direction of the image processing apparatus is displayed in step S807, the communication may be handed over from the Bluetooth® communication to wireless LAN communication, and data may be transmitted/received through the wireless LAN communication. FIG. 8B is a flowchart illustrating the example. In step S808, it is determined whether the user has approached the image processing apparatus 100 while the direction of the image processing apparatus 100 is displayed on the mobile terminal 110. More specifically, when the radio field intensity of the Bluetooth® packet received by the mobile terminal 110 becomes greater than or equal to a predetermined threshold, the mobile terminal 110 determines that the user has approached the image processing apparatus 100. In a case where the mobile terminal 110 determines that the user has approached the image processing apparatus 100 (YES in step S808), the processing proceeds to step S809. In step S809, the mobile terminal 110 receives wireless LAN connection information for performing the wireless LAN communication with the image processing apparatus 100, from the image processing apparatus 100 through the Bluetooth® communication. The mobile terminal 110 performs handover by using the received wireless LAN connection information. At this time, the wireless direction connection may be performed through the access point inside the image processing apparatus 100, or the wireless LAN connection may be performed through the external access point 120. In step S810, the mobile terminal 110 transmits print data to the image processing apparatus 100 or receives scan data from the image processing apparatus 100, through the wireless LAN communication in response to an instruction by the user. In this example, the handover is performed when the mobile terminal 110 and the image processing apparatus 100 approach each other in step S808; however, the handover may be performed in response to other factors. For example, the handover may be performed in a case where it is detected that the image processing apparatus 100 is located in front of the mobile terminal 110 (state in FIG. 7A) or a case where the user performs a predetermined operation (e.g., operation to select displayed image processing apparatus on terminal).

The effect by the processing in the flowchart of FIG. 8B is as follows. When a predetermined condition with the image processing apparatus, the direction of which is displayed on the retrieval screen of the mobile terminal 110, is satisfied, the user can perform the wireless LAN communication connection.

Second Exemplary Embodiment

Figure 9A:
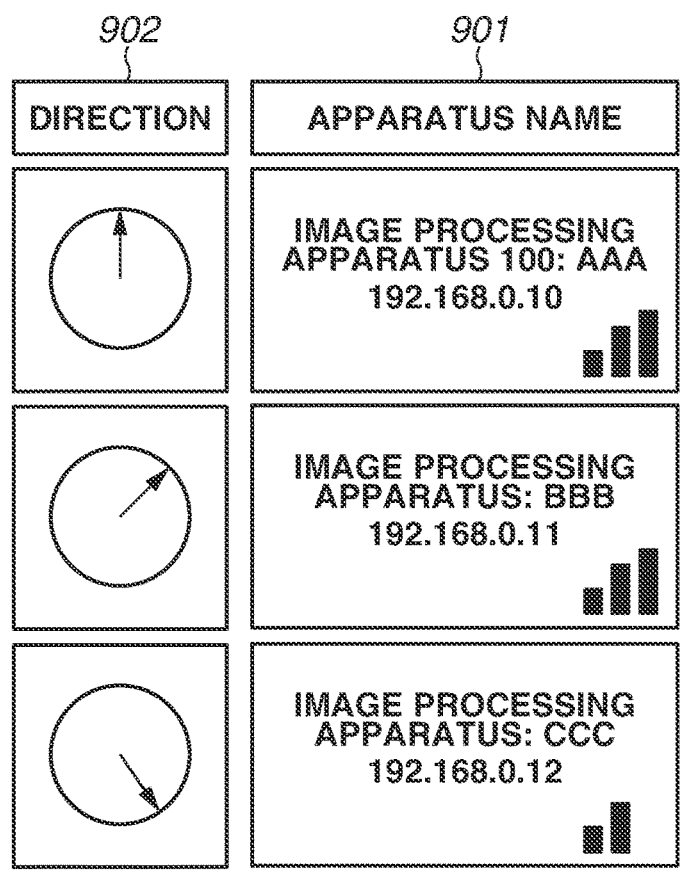
FIGS. 9A and 9B are diagrams each illustrating a state where a mobile terminal displays directions of image processing apparatuses according to a second exemplary embodiment.
Figure 9B:
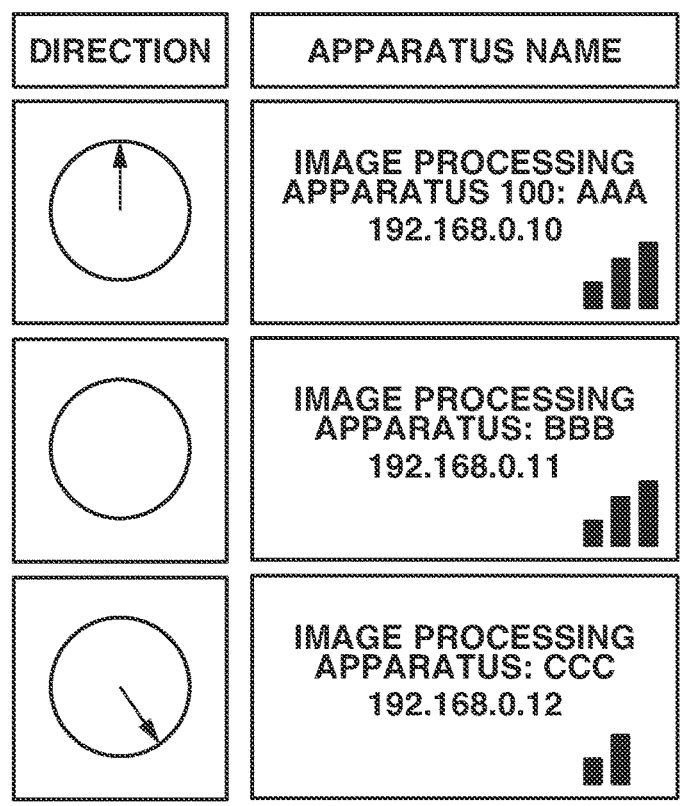

In the first exemplary embodiment, when the user selects one image processing apparatus in the retrieval screen of the image processing apparatus, the direction of the selected apparatus is displayed. In a second exemplary embodiment, directions of a plurality of image processing apparatuses are simultaneously displayed on the retrieval screen. FIGS. 9A and 9B are diagrams each illustrating a state where directions of apparatuses are simultaneously displayed on the screen to retrieve the apparatuses supporting Bluetooth® of the mobile terminal 110.

FIG. 9A is a diagram in a case where all of the retrieved apparatuses support Bluetooth® 5.1 Retrieved apparatus names are displayed in a column 901, and directions corresponding to the respective apparatuses are displayed in a column 902. In addition, the radio field intensities of the respective apparatuses may be displayed.

FIG. 10 is a flowchart of processing to perform the display in FIG. 9A. In step S1001, the mobile terminal 110 opens the screen to retrieve the image processing apparatuses supporting Bluetooth® in response to an instruction from the user. In step S1002, the mobile terminal 110 receives the Bluetooth® advertise packets from the image processing apparatus 100 and nearby Bluetooth® apparatuses. In step S1003, the mobile terminal 110 identifies the received packet for each apparatus by using an apparatus-specific identifier such as an IP address or a universally unique identifier (UUID) included in the received packet. In step S1004, the mobile terminal 110 determines whether an apparatus not subjected to direction detection is present among the apparatuses transmitting the packets. In step S1005, the mobile terminal 110 selects one of the apparatuses not subjected to direction detection. In step S1006, the mobile terminal 110 determines whether the angle of the selected apparatus is estimated based on the AoA or the AoD. In this example, the information on the packet transmitted from the image processing apparatus 100 is used to determine the AoA or AoD; however, the determination may be performed by another method. In step S1007, the mobile terminal 110 calculates an angle by using the phase difference between the radio waves received from the selected apparatus, the wavelengths of the radio waves, and information included in the packet such as a distance between the antennas. The mobile terminal 110 estimates the direction of the image processing apparatus 100 by using the calculated angle. In step S1008, the mobile terminal 110 associates the information and the direction of the apparatus based on the direction estimated in step S1007 and the information included in the packet, and displays the information and the direction of the apparatus on the same retrieval screen. At this time, intensities of the radio waves received from the selected apparatus may be detected and displayed in the retrieval screen at the same time. The processing after step S1005 is performed after one apparatus is selected in step S1005; however, the processing is not limited thereto. A plurality of apparatuses may be selected at the same time in step S1005, and the processing after step S1005 may be performed on the plurality of apparatuses in parallel.

The effect by the processing in the flowchart of FIG. 10 is as follows. In the retrieval of the image processing apparatuses, the user can recognize the directions of the plurality of image processing apparatuses at the same time.

FIG. 9B is a diagram in a case where an apparatus not supporting Bluetooth® 5.1 is included in the retrieval result. An apparatus having an apparatus name BBB does not support Bluetooth® 5.1, and an angle of the apparatus cannot be calculated. Therefore, the direction of the apparatus is not displayed.

The directions of the apparatuses are displayed in real time in FIGS. 9A and 9B as with the first exemplary embodiment. Therefore, even when the direction of the mobile terminal 110 is changed, the directions of the apparatuses are continuously displayed. In a case where the received packet includes the flag information representing that the image processing apparatus 100 is unusable due to a reason such as execution of printing or occurrence of error, the display of the image processing apparatus may be changed. As with the first exemplary embodiment, when the predetermined condition is satisfied while the angle of the image processing apparatus is displayed on the retrieval screen of the mobile terminal 110, the mobile terminal 110 may perform the wireless LAN communication connection with the image processing apparatus.

Third Exemplary Embodiment

In the first and second exemplary embodiments, the directions of the apparatuses are displayed. Alternatively, apparatuses to be retrieved may be displayed on a map based on information on a distance from each of the apparatuses obtained from the radio field intensity of the packet and the information on the direction. The example is described in a third exemplary embodiment.

Figure 11A:
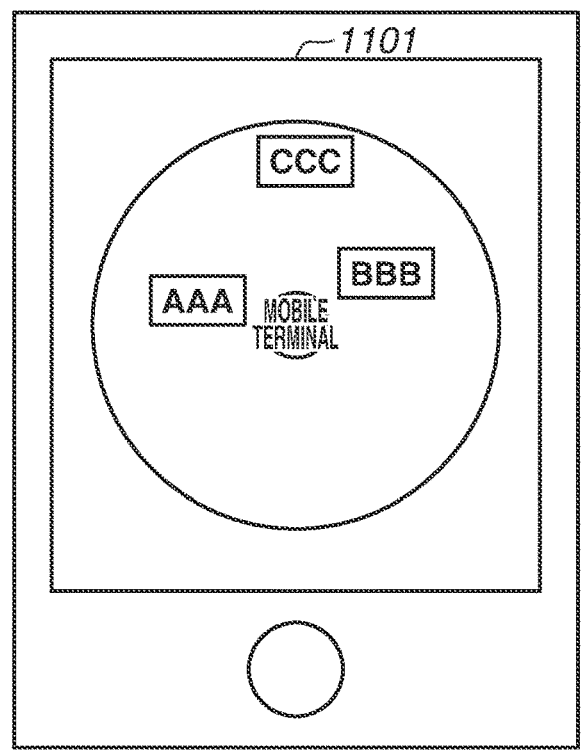
FIGS. 11A and 11B are diagrams each illustrating a state where a mobile terminal displays directions of image processing apparatuses according to a third exemplary embodiment.

FIG. 11A is a diagram in a case where the apparatuses to be retrieved in the retrieval screen of the mobile terminal are displayed on the map. A center in a screen 1101 corresponds to a position of the mobile terminal 110, and the positions of the apparatuses having the apparatus names AAA, BBB, and CCC as viewed from the mobile terminal 110 are displayed on the map.

Figure 11B:
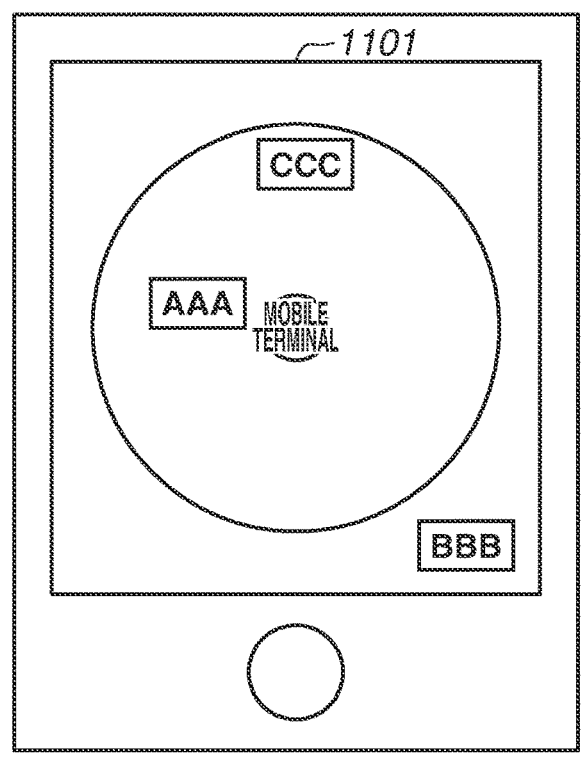

FIG. 11B is a diagram in the case where an apparatus not supporting Bluetooth® 5.1 is included in the retrieval result. The apparatus having the apparatus name BBB does not support Bluetooth® 5.1, and the angle of the apparatus cannot be calculated. Therefore, the apparatus is not displayed on the map. This is realized by calculating the direction and the distance of the apparatus from the Bluetooth® packet transmitted from the apparatus, and integrating the direction and the distance. When the mobile terminal 110 is directed to a direction of the closest apparatus that has a high radio field intensity, the mobile terminal 110 may be vibrated, or the communication may be handed over to the wireless LAN. Further, an icon representing the image processing apparatus that has the high radio field intensity may be largely displayed on the map in a different way from the other apparatuses, or may be blinked for recognition by the user. Further, although only the apparatus names are displayed on the map, other information may be displayed, or detailed information such as the IP address may be displayed in response to selection of the apparatus name.

Fourth Exemplary Embodiment

In the above-described exemplary embodiments, it is assumed that the plurality of antennas is provided horizontal to the ground, and the directions of the apparatuses are detected on a horizontal plane. However, the antennas are provided not only in the horizontal direction but also in a vertical direction, and thereby, the directions of the apparatuses can be stereoscopically detected in vertical and horizontal directions. It is supposed that, in a scene where the image processing apparatuses are retrieved, there are few cases where the image processing apparatuses located above and below, namely, on a floor above or below a retrieval position are retrieved. Therefore, in the case of the stereoscopic direction detection, an apparatus detected above or below the retrieval position may not be displayed in the retrieval result, or may be grayed out and changed in display.

According to the exemplary embodiments of the present disclosure, the directions of the image processing apparatuses retrieved using the direction detection function are displayed to specify the position of the image processing apparatus with which the user desires to communicate, which facilitates the wireless LAN communication with a desired apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (RUM), a storage of distributed computing systems, an optical disk (such as a compact disc (CD), digital versatile disc (DVD), or Blu-ray Disc (BD™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-147446, filed Aug. 9, 2019, which is hereby incorporated by reference herein in its entirety.

What is claimed is:

1. A terminal performing Bluetooth communication with an apparatus and having at least two antennas receiving Bluetooth signal, the terminal comprising:
    a communicator configured to receive a Bluetooth signal transmitted from the apparatus;
    a memory storing instruction; and
    at least one processor executing the instructions causing the terminal to:
    calculate a direction of the apparatus with the terminal as a reference based on a phase difference between signals received on the at least two antennas;
    establish wireless LAN communication with the apparatus using connection information included in the received Bluetooth signal according to the calculated direction satisfying a predetermined condition; and
    transmit a job to the apparatus via the established wireless LAN communication.

2. A method of controlling a terminal that performs Bluetooth communication with an apparatus and has at least two antennas receiving Bluetooth signal, the method comprising:
    calculating a direction of the apparatus with the terminal as a reference based on a phase difference between signals received on the at least two antennas;
    establishing wireless LAN communication with the apparatus using connection information included in the received Bluetooth signal according to the calculated direction satisfying a predetermined condition; and
    transmitting a job to the apparatus via the established wireless LAN communication.

3. The method according to claim 2, wherein the predetermined condition is that the apparatus is located in front of the terminal.

4. The method according to claim 2, wherein the signal used to detect the location direction of the image processing apparatus conforms to Bluetooth 5.1 standard or newer standards.

5. The method according to claim 2, wherein the location direction is calculated by detecting an angle of the signal based on a radio wave corresponding to the signal and information included in the signal.

6. The method according to claim 2, wherein the location direction is calculated by detecting an angle of the signal based on a phase difference between radio waves corresponding to the signals, wavelengths of the radio waves, and a distance between the at least two antennas.

7. The method according to claim 2, wherein the location direction of the apparatus is calculated based on at least any of an angle entering an antenna of the terminal, of a radio wave corresponding to the signal, or an angle of the signal transmitted from an antenna of the image processing apparatus to the terminal.

8. The method according to claim 2, further comprising:
calculating a distance between the apparatus and the at least two antennas based on the signal intensity of the received signal; and
simultaneously displaying, on the display unit, information of the calculated distance, the information of the apparatus, and the calculated direction of the apparatus.

9. The method according to claim 2, wherein the apparatus is an image processing apparatus including at least a printing function and a scanning function and wherein the terminal transmits print job to the apparatus and/or receives scan data from the apparatus.

10. The method according to claim 2, further comprising establishing the wireless communication with the apparatus using the connection information included in the received Bluetooth signal according to signal strength of the received Bluetooth signal being above a predetermined value and the calculated direction satisfying the predetermined condition.

11. The method according to claim 2, further comprising;
obtaining information of the apparatus based on the received signal; and
simultaneously displaying, on a display unit, the information of the apparatus and the calculated direction of the apparatus.

12. The method according to claim 11, the information of the apparatus is name of the apparatus.

13. The method according to claim 11, wherein the terminal simultaneously displays the information of the apparatus, information of a signal intensity of the received signal, and information of the calculated direction of the apparatus.

14. The method according to claim 2, further comprising:
displaying, based on the calculated direction, a direction in which the apparatus is located; and
establishing the wireless LAN communication with the apparatus without user operation according to the displayed direction indicating a predetermined direction.

15. A non-transitory computer-readable storage medium storing a program to cause a computer to perform a method of controlling a terminal that performs Bluetooth communication with an apparatus, the method comprising:
calculating a direction of the apparatus with the terminal as a reference based on a phase difference between signals received on the at least two antennas;
establishing wireless LAN communication with the apparatus using connection information included in the received Bluetooth signal according to the calculated direction satisfying a predetermined condition; and
transmitting a job to the apparatus via the established wireless LAN communication.

* * * * *